United States Patent
Yeo et al.

(10) Patent No.: US 11,128,411 B2
(45) Date of Patent: Sep. 21, 2021

(54) METHOD AND DEVICE FOR DETECTING CONTROL SIGNAL IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Jinyoung Oh, Seoul (KR); Sungjin Park, Incheon (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/347,478

(22) PCT Filed: Oct. 31, 2017

(86) PCT No.: PCT/KR2017/012124
§ 371 (c)(1),
(2) Date: May 3, 2019

(87) PCT Pub. No.: WO2018/084521
PCT Pub. Date: May 11, 2018

(65) Prior Publication Data
US 2019/0280825 A1    Sep. 12, 2019

(30) Foreign Application Priority Data

Nov. 3, 2016    (KR) .......................... 10-2016-0146068

(51) Int. Cl.
*H04W 72/04* (2009.01)
*H04L 1/18* (2006.01)
*H04L 5/00* (2006.01)

(52) U.S. Cl.
CPC .......... *H04L 1/1861* (2013.01); *H04L 1/1854* (2013.01); *H04L 1/1896* (2013.01); *H04L 5/00* (2013.01); *H04W 72/0406* (2013.01)

(58) Field of Classification Search
None
See application file for complete search history.

(56) References Cited

U.S. PATENT DOCUMENTS

2010/0248765 A1*  9/2010  Chun ................... H04L 1/1819
                                                             455/509
2011/0019776 A1    1/2011  Zhang et al.
(Continued)

FOREIGN PATENT DOCUMENTS

KR    1020180039504    4/2018

OTHER PUBLICATIONS

LTE; Evolved Universal Terrestrial Radio Access (E-UTRA); Multiplexing and channel coding 3GPP TS 36.212 version 8.8.0 Release 8 (Year: 2010).*
LG Electronics, "Remaining Issues on Shortened Processing Time for 1ms TTI", R1-1609211, 3GPP TSG RAN WG1 Meeting #86bis, Oct. 10-14, 2016, 4 pages.
Samsung, "DCI Formats and Contents for NR", R1-1609131, 3GPP TSG RAN WG1 #86bis, Oct. 10-14, 2016, 5 pages.

(Continued)

*Primary Examiner* — Brandon M Renner
(74) *Attorney, Agent, or Firm* — The Farrell Law Firm, P.C.

(57) ABSTRACT

The present invention relates to a communication technique, which is a convergence of IoT technology and 5G communication system for supporting higher data transmission rate beyond 4G system, and a system for same. The present invention can be applied to smart services (e.g. smart homes, smart buildings, smart cities, smart cars or connected cars, health care, digital education, retail businesses, security- and safety-related services and the like) on the basis of 5G communication technology and IoT-related technology. The present invention provides a method for detecting a downlink control signal when a delay time reduction mode terminal is set to a delay reduction mode.

10 Claims, 12 Drawing Sheets

(56) References Cited

U.S. PATENT DOCUMENTS

| | | | | |
|---|---|---|---|---|
| 2012/0281566 | A1* | 11/2012 | Pelletier | H04W 76/27 370/252 |
| 2014/0016519 | A1* | 1/2014 | Kim | H04L 1/1812 370/280 |
| 2015/0049695 | A1* | 2/2015 | Aiba | H04L 5/0048 370/329 |
| 2015/0078306 | A1 | 3/2015 | Meyer et al. | |
| 2016/0066345 | A1* | 3/2016 | Sun | H04J 11/004 370/329 |
| 2016/0165577 | A1* | 6/2016 | Davydov | H04L 1/0059 370/329 |
| 2016/0302176 | A1 | 10/2016 | Ahn et al. | |
| 2017/0353273 | A1* | 12/2017 | Zhang | H04W 4/06 |
| 2018/0103462 | A1 | 4/2018 | Yeo et al. | |
| 2018/0131598 | A1* | 5/2018 | Suzuki | H04L 5/001 |
| 2018/0242316 | A1* | 8/2018 | Takeda | H04W 72/0446 |
| 2018/0324839 | A1* | 11/2018 | Feng | H04W 72/02 |

OTHER PUBLICATIONS

ZTE, ZTE Microelectronics, "On Indicating HARQ and PUCCH", R1-1608958, 3GPP TSG-RAN WG1 Meeting #86bis, Oct. 10-14, 2016, 6 pages.
Sharp, "DL HARQ and UL Scheduling Timing in NR", R1-1609877, 3GPP TSG RAN WG1 Meeting #86bis, Oct. 10-14, 2016, 3 pages.
European Search Report dated Sep. 13, 2019 issued in counterpart application No. 17867192.1-1219, 10 pages.
PCT/ISA/210 Search Report issued on PCT/KR2017/012124, pp. 5.
PCT/ISA/237 Written Opinion issued on PCT/KR2017/012124, pp. 6.
Nokia, Alcatel-Lucent Shanghai Bell, 3GPP TSG-RAN WG1 #86-BIS, R1-160743, Lisbon, Portugal, Oct. 1, 2016, Enhanced redundancy matching for HARQ transmission, pp. 7.
LG Electronics, 3GPP TSG RAN WG1 Meeting #86bis, R1-1609216, Lisbon, Portugal, Oct. 1, 2016, sPUCCH for HARQ-ACK in shortened TTI, pp. 9.

* cited by examiner

METHOD AND DEVICE FOR DETECTING CONTROL SIGNAL IN WIRELESS CELLULAR COMMUNICATION SYSTEM

PRIORITY

This application is a National Phase Entry of PCT International Application No. PCT/KR2017/012124 which was filed on Oct. 31, 2017, and claims priority to Korean Patent Application No. 10-2016-0146068, which was filed on Nov. 3, 2016, the content of each of which is incorporated herein by reference.

BACKGROUND

1. Field

The present invention relates to a wireless communication system, and more particularly, to a method and apparatus for detecting a downlink control signal. More particularly, the present invention relates to a method for detecting a downlink control signal when the latency reduction mode is configured for the terminal supporting latency reduction mode operation.

2. Related Art

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system". To achieve higher data rates, 5G communication systems consider utilization of the mmWave band (e.g., 60 GHz band).

To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like.

In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development.

In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs to big data processing described above may be an instance of convergence of 5G communication technology and IoT technology.

As described above, a plurality of services can be provided to users in a communication system. To provide a plurality of services to users, a method and apparatus are needed that can provide multiple services during the same time interval in accordance with their characteristics.

In a wireless communication system, particularly in the existing LTE system, hybrid automatic repeat request (HARQ) acknowledgment or negative acknowledgment (ACK or NACK) information indicating success or failure of data transmission is sent to the base station in the uplink after 3 ms from the reception of downlink data.

For example, for the physical downlink shared channel (PDSCH) data received at subframe n by the terminal from the base station, the HARQ ACK/NACK information is transmitted at subframe n+4 to the base station through the physical uplink control channel (PUCCH) or the physical uplink shared channel (PUSCH). Additionally, in a frequency division duplex (FDD) LTE system, the base station may transmit the terminal downlink control information (DCI) including uplink resource allocation information or a retransmission request through the physical hybrid ARQ indicator channel (PHICH). When the terminal receives the uplink data transmission scheduling at subframe n, the terminal performs uplink data transmission at subframe n+4. That is, PUSCH transmission is performed at subframe n+4.

The above example is a description related with the FDD LTE system. In the case of a time division duplex (TDD) LTE system, the HARQ ACK/NACK transmission timing and the PUSCH transmission timing are changed according to the uplink-downlink subframe configuration, and are performed according to preset rules.

SUMMARY

In the FDD or TDD LTE system, the HARQ ACK/NACK transmission timing and the PUSCH transmission timing are preset according to the case where the signal processing time required for the base station and the terminal is about 3 ms. If the signal processing time of the LTE base station and the terminal is reduced to 1 ms or 2 ms, the latency time for data transmission can be reduced.

In other words, since the DCI format for downlink control signals may be different according to the timing settings, the terminal supporting such latency reduced transmission needs to efficiently perform the control signal detection operation. Accordingly, an aspect of the present invention is to provide a method and apparatus that enable the terminal to detect a downlink control signal according to the timing related settings such as the normal mode and the latency reduction mode.

In accordance with an aspect of the present invention, there is provided a method by a terminal in a wireless communication system. The method may include: receiving, from a base station, configuration information for configuring a specific transmission timing for the terminal; and monitoring, based on the configuration information, control information transmitted from the base station using a control information format including HARQ process identification information.

In accordance with another aspect of the present invention, there is provided a method by a base station in a wireless communication system. The method may include: transmitting, to a terminal, configuration information for configuring a specific transmission timing for the terminal; and transmitting, to the terminal, control information for the terminal including hybrid automatic repeat request (HARQ) process identification information.

In accordance with another aspect of the present invention, there is provided a terminal in a wireless communication system. The terminal may include: a transceiver; and a controller configured to: control the transceiver to receive, from a base station, configuration information for configuring a specific transmission timing for the terminal, and monitor, based on the configuration information, control information transmitted from the base station using a control information format including bit fields for HARQ process identification information and redundancy version (RV) information.

In accordance with another aspect of the present invention, there is provided a base station in a wireless communication system. The base station may include: a transceiver; and a controller configured to: control the transceiver to transmit, to a terminal, configuration information for configuring a specific transmission timing for the terminal, and control the transceiver to transmit, to the terminal, control information including HARQ process identification information.

In a feature of the present invention, there is provided a control signal decoding method that enables the base station and the terminal to efficiently perform control signal decoding in latency reduction mode operations.

BRIEF DESCRIPTION OF DRAWINGS

FIG. 1I depicts a control signal decoding method according to the first embodiment.

DETAILED DESCRIPTION

Figure 1A:
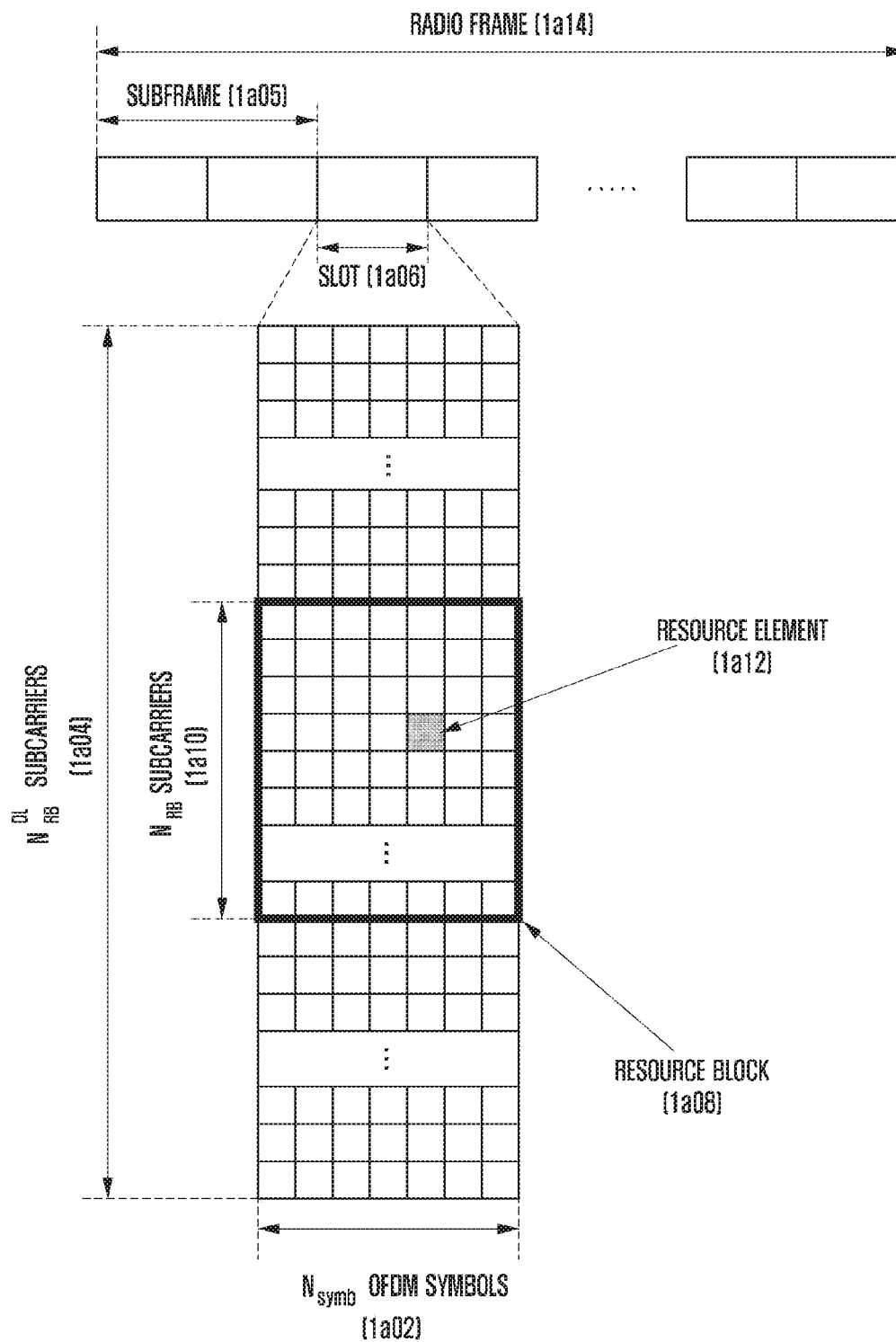
FIG. 1A illustrates a time-frequency domain structure for downlink transmission in the LTE or LTE-A system.

Hereinafter, embodiments of the present invention are described in detail with reference to the accompanying drawings. Descriptions of well-known functions and structures incorporated herein may be omitted to avoid obscuring the subject matter of the present invention. Particular terms may be defined to describe the invention in the best manner. Hence, the meaning of specific terms or words used in the specification and the claims should be construed in accordance with the spirit of the present invention.

The aspects, features, and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustrative purposes only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart.

As the computer program instructions may be stored in a computer readable memory that is usable in a specialized computer or a programmable data processing equipment, it is also possible to create articles of manufacture that carry out functions described in the flowchart.

As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables.

A function provided by a component and unit may be a combination of smaller components and units, and it may be combined with others to compose large components and units. Components and units may be configured to drive a device or one or more processors in a secure multimedia card. In a certain embodiment, a unit or the like may include one or more processors.

In contrast to early wireless communication systems that provided voice-oriented services only, advanced broadband wireless communication systems, such as 3GPP high speed packet access (HSPA) systems, long term evolution (LTE) or evolved universal terrestrial radio access (E-UTRA) systems, LTE-advanced (LTE-A) systems, 3GPP2 high rate packet data (HRPD) systems, ultra mobile broadband (UMB) systems, and IEEE 802.16e based systems, may provide high-speed and high-quality packet data services. In addition, communication standards are being developed for 5G or NR (new radio) systems as the fifth generation wireless communication system.

In a wireless communication system such as the 5G system, at least one of Enhanced Mobile Broadband (eMBB), Massive Machine Type Communications (mMTC), and Ultra-Reliable and Low-Latency Communications (URLLC) services can be provided to the terminal. These services can be provided to the same terminal during the same time interval.

Here, eMBB may be a service aiming at high-speed transmission of high-volume data, mMTC may be a service aiming at minimizing terminal power and connecting many terminals, and URLLC may be a service aiming at high reliability and low latency. These three services may correspond to major scenarios in 5G or NR (new radio, next radio) systems after LTE or post LTE systems. In embodiments, the methods and apparatus for coexistence of eMBB and URLLC or coexistence of mMTC and URLLC are described.

When the base station has scheduled eMBB data to a terminal in a specific transmission time interval (TTI), there may occur a situation where URLLC data is to be transmitted in that TTI. In this case, instead of transmitting a portion of the eMBB data in a frequency band where the eMBB data is already scheduled and transmitted, the generated URLLC data may be transmitted in that frequency band. Here, the terminal on which the eMBB data is scheduled and the terminal on which the URLLC data is scheduled may be the same terminal or may be different terminals.

In such a case, there is a possibility that the eMBB data is damaged because a portion of the eMBB data that has already been scheduled and transmitted is not transmitted. Hence, it is necessary to determine a method of signal processing and signal reception for the terminal on which eMBB data is scheduled or for the terminal on which URLLC data is scheduled.

In the following embodiments, a description is given of a method for coexistence between heterogeneous services capable of transmitting each service information when eMBB information and URLLC information are scheduled simultaneously, when mMTC information and URLLC information are scheduled simultaneously, when mMTC information and eMBB information are scheduled simultaneously, or when eMBB information, URLLC information, and mMTC information are scheduled simultaneously, in a way that some or all of the frequency bands are shared.

Hereinafter, embodiments of the present invention are described in detail with reference to the accompanying drawings. Descriptions of related functions and structures incorporated herein may be omitted to avoid obscuring the subject matter of the present invention. Particular terms may be defined to describe the invention in the best manner. Hence, the meaning of specific terms or words used in the specification and the claims should be construed in accordance with the spirit of the present invention.

In the following description, the term "base station" refers to a main agent allocating resources to terminals and may be at least one of eNode B, Node B, BS, radio access unit, base station controller, and network node. The term "user equipment (UE)" may refer to at least one of mobile station (MS), cellular phone, smartphone, computer, and multimedia system with a communication function. The term "downlink (DL)" refers to a wireless transmission path through which the base station sends a signal to the terminal, and the term "uplink (UL)" refers to a wireless transmission path through which the terminal sends a signal to the base station.

The following description of embodiments is focused on the LTE or LTE-A system. However, it should be understood by those skilled in the art that embodiments of the present invention are applicable to other communication systems having similar technical backgrounds and channel configurations without significant modifications departing from the scope of the present invention. For example, embodiments of the present invention can be applied to the 5G mobile communication technology (5G, new radio, NR) developed after LTE-A.

In the LTE system as a representative example of a wideband wireless communication system, orthogonal frequency division multiplexing (OFDM) is used for the downlink (DL) and single carrier frequency division multiple access (SC-FDMA) is used for the uplink (UL). The uplink refers to a radio link through which a terminal (user equipment (UE) or mobile station (MS)) sends a data or control signal to a base station (BS or eNode B), and the downlink refers to a radio link through which a base station sends a data or control signal to a terminal. In such multiple access schemes, time-frequency resources used to carry user data or control information are allocated so as not to overlap each other (i.e. maintain orthogonality) to thereby identify the data or control information of a specific user.

The LTE system employs hybrid automatic repeat request (HARQ) to retransmit data at the physical layer when a decoding error has occurred in the initial transmission. HARQ is a scheme that enables the receiver having failed in decoding data to transmit information (negative acknowledgement (NACK)) indicating the decoding failure to the transmitter so that the transmitter can retransmit the corresponding data at the physical layer. The receiver may combine the retransmitted data with the previously received data for which decoding has failed, increasing data reception performance. When the data is correctly decoded, the receiver may send information (acknowledgement (ACK)) indicating successful decoding to the transmitter so that the transmitter can transmit new data.

FIG. 1A illustrates the basic structure of the time-frequency domain serving as radio resources to transmit data or control channels in the downlink of the LTE system or a similar system.

In FIG. 1A, the horizontal axis denotes the time domain and the vertical axis denotes the frequency domain. In the time domain, the minimum unit for transmission is OFDM symbols, $N_{symb}$ OFDM symbols 1*a*02 constitute one slot 1*a*06, and two slots constitute one subframe 1*a*05. The length of a slot is 0.5 ms and the length of a subframe is 1.0 ms. The radio frame 1a14 is a time domain unit composed of 10 subframes. In the frequency domain, the minimum unit for transmission is subcarriers, and the total system transmission bandwidth is composed of total $N_B U$ subcarriers 1a04. However, such values can be applied variably.

The basic unit of resources in the time-frequency domain is a resource element (RE) 1a12 and the RE may be represented by an OFDM symbol index and a subcarrier index. A resource block (RB, or physical resource block (PRB)) 1a08 is defined by $N_{symb}$ consecutive OFDM symbols 1a02 in the time domain and Na consecutive subcarriers 1a10 in the frequency domain. Hence, one RB 1a08 is composed of $N_{symb} \times N_{RB}$ REs 1a12. In general, the minimum allocation unit for data in the frequency domain is the RB. Normally, in the LTE system, $N_{symb}=7$ and $N_{RB}=12$, and $N_{BW}$ and $N_{RB}$ may be proportional to the bandwidth of the system transmission band.

The data rate may increase in proportion to the number of resource blocks scheduled for the terminal. The LTE system defines and operates six transmission bandwidths. In the case of an FDD system where downlink and uplink frequencies are separately used, the downlink transmission bandwidth may differ from the uplink transmission bandwidth. The channel bandwidth denotes an RF bandwidth corresponding to the system transmission bandwidth. Table 1 illustrates a correspondence between the system transmission bandwidth and the channel bandwidth defined in the LTE system. For example, the transmission bandwidth of an LTE system having a channel bandwidth of 10 MHz may be composed of 50 resource blocks.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

In a subframe, N initial OFDM symbols are used to transmit downlink control information. In general, N={1, 2, 3}. The value of N varies for each subframe according to the amount of control information to be sent at the current subframe. The control information may include a control channel transmission interval indicator indicating the number of OFDM symbols carrying control information, scheduling information for downlink data or uplink data, and HARQ ACK/NACK information.

In the LTE system, scheduling information for downlink data or uplink data is sent by the base station to the terminal through downlink control information (DCI). Various DCI formats are defined. The DCI format to be used may be determined according to various parameters related to scheduling information for uplink data (UL grant), scheduling information for downlink data (DL grant), compact DCI with a small size, spatial multiplexing using multiple antennas, and power control DCI. For example, DCI format 1 for scheduling information of downlink data (DL grant) is configured to include at least one of the following pieces of control information.

Resource allocation type 0/1 flag: this indicates whether the resource allocation scheme is of type 0 or type 1. Type 0 indicates resource allocation in units of Resource Block Group (RBG) by use of a bitmap. In the LTE system, the basic scheduling unit is a resource block (RB) represented as a time-frequency domain resource. An RBG including multiple RBs is the basic scheduling unit for type 0. Type 1 indicates allocation of a specific RB in one RBG.

Resource block assignment: this indicates an RB allocated for data transmission. The resource represented by resource block assignment is determined according to the system bandwidth and resource allocation type.

Modulation and coding scheme (MCS): this indicates the modulation scheme applied for data transmission and the transport block (TB) size for data to be sent.

HARQ process number: this indicates the process number of the corresponding HARQ process.

New data indicator: this indicates either initial transmission or retransmission for HARQ.

Redundancy version: this indicates the redundancy version for HARQ.

TPC (transmit power control) command for PUCCH: this indicates a TPC command for the physical uplink control channel (PUCCH) being an uplink control channel.

The DCI can be channel coded, modulated, and sent through the physical downlink control channel (PDCCH or control information) or EPDCCH (enhanced PDCCH or enhanced control information).

In general, for each terminal, the DCI is scrambled with a specific radio network temporary identifier (RNTI, or terminal ID), appended by a cyclic redundancy check (CRC) value, channel coded, and transmitted via an independent PDCCH. In the time domain, the PDCCH is mapped and transmitted during the control channel transmission interval. In the frequency domain, the mapping position of the PDCCH is determined by the identifier (ID) of each terminal and the PDCCH may be dispersed across the overall system transmission bandwidth.

Downlink data may be sent via the physical downlink shared channel (PDSCH) serving as a shared physical downlink data channel. The PDSCH can be sent after the control channel transmission interval. Scheduling information for the PDSCH such as mapping positions in the frequency domain or the modulation scheme is determined based on the DCI transmitted on the PDCCH.

The base station uses the MCS field of control information constituting the DCI to notify the terminal of the modulation scheme applied to the PDSCH (to be sent to UE) and the size of data to be sent (transport block size (TBS)). In one embodiment, the MCS field may be composed of about 5 bits. The TBS indicates the size of a transport block (TB) before channel coding is applied for error correction.

Modulation schemes supported by the LTE system include QPSK (quadrature phase shift keying), 16QAM (quadrature amplitude modulation), and 64QAM, whose modulation order (Qm) is 2, 4 and 6, respectively. That is, it is possible to send 2, 4, and 6 bits per symbol by using QPSK, 16QAM, and 64QAM, respectively. Depending on the system variant, a modulation scheme of 256QAM or more can be used.

Figure 1B:
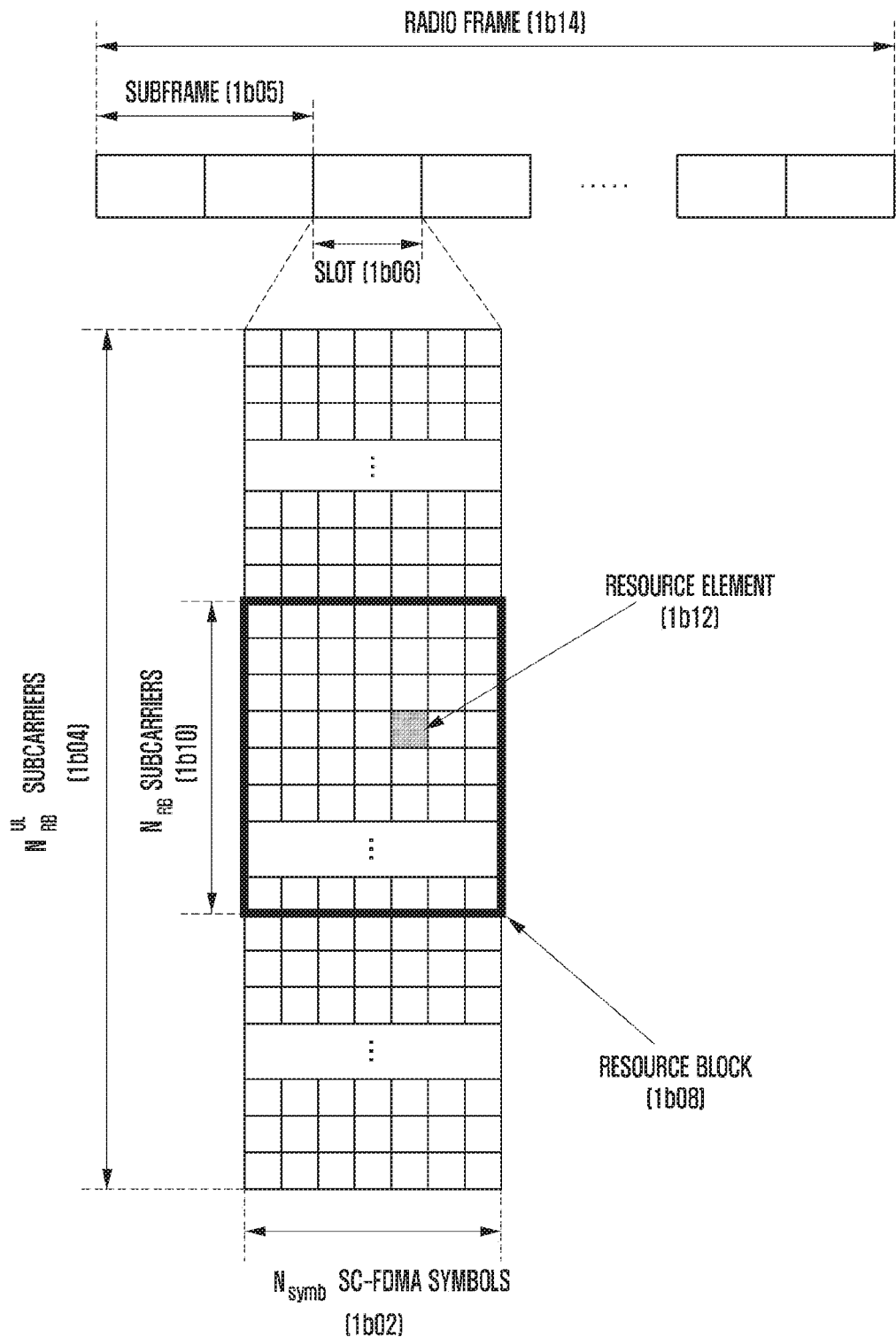
FIG. 1B illustrates a time-frequency domain structure for uplink transmission in the LTE or LTE-A system.

FIG. 1B illustrates the basic structure of the time-frequency domain serving as radio resources to transmit data or control channels in the uplink of the LTE-A system.

In FIG. 1B, the horizontal axis denotes the time domain and the vertical axis denotes the frequency domain. In the time domain, the minimum unit for transmission is SC-FDMA symbols 1b02, $N_{symb}^{UL}$ SC-FDMA symbols constitute one slot 1b06, and two slots constitute one subframe 1b06. In the frequency domain, the minimum unit for transmission is subcarriers, and the total system transmission bandwidth 1*b*04 is composed of total $N_{BW}$ subcarriers. The value of $N_{BW}$ is proportional to the system transmission bandwidth.

The basic unit of resources in the time-frequency domain is a resource element (RE) 1*b*12. The RE may be represented by an SC-FDMA symbol index and a subcarrier index. A resource block (RB) pair 1*b*08 may be defined by $N_{symb}^{UL}$ consecutive SC-FDMA symbols in the time domain and $N_{sc}^{RB}$ consecutive subcarriers in the frequency domain. Hence, one RB is composed of $N_{symb}^{UL} \times N_{sc}^{RB}$ REs. In general, the minimum unit for transmitting data or control information is a resource block. The PUCCH is mapped to one RB in the frequency domain and transmitted for one subframe.

In the LTE system, for the PDSCH (physical layer channel for downlink data transmission) or the PDCCH/EPDDCH containing semi-persistent scheduling (SPS) release, the timing of the PUCCH or PUSCH (uplink physical layer channel sending HARQ ACK/NACK) may be fixed. For example, in the LTE system operating in frequency division duplex (FDD) mode, for the PDSCH or PDCCH/EPDCCH containing SPS release transmitted at subframe n−4, HARQ ACK/NACK is sent through the PUCCH or PUSCH at subframe n.

The LTE system adopts an asynchronous HARQ scheme in the downlink where the data retransmission timing is not fixed. That is, when HARQ NACK is fed back by the terminal in response to the initial data transmission from the base station, the base station may determine the retransmission timing freely according to the scheduling operation. For HARQ operation, the terminal may buffer the data causing a decoding error and combine the buffered data with the next retransmission data.

For the PDSCH transmitted at subframe n−k, HARQ ACK/NACK information is sent by the terminal to the base station through the PUCCH or PUSCH at subframe n. Here, the value of k is specified differently for the FDD or TDD (time division duplex) mode and its subframe configuration. For example, k is fixed to 4 for the FDD LTE system.

For the TDD LTE system, the value of k may vary according to the subframe configuration and subframe number. When data is transmitted through a plurality of carriers, the value of k may be applied differently according to the TDD configuration of each carrier. For the TDD LTE system, the value of k varies according to the TDD UL-DL configuration as illustrated in Table 2.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | — | 7 | 5 | — | — | 7 | 7 | — |

The LTE system adopts a synchronous HARQ scheme having fixed data transmission points in the uplink unlike downlink HARQ. That is, the uplink/downlink timing relationship among Physical Uplink Shared Channel (PUSCH) for data transmission, Physical Downlink Control Channel (PDCCH) followed by the PUSCH, and Physical Hybrid Indicator Channel (PHICH) carrying downlink HARQ ACK/NACK corresponding to the PUSCH are fixed according to the following rules.

When the PDCCH carrying uplink scheduling control information or the PHICH carrying downlink HARQ ACK/NACK is received from the base station at subframe n, the terminal transmits the PUSCH carrying uplink data corresponding to the control information at subframe n+k. Here, the value of k may be specified differently for the FDD mode or TDD mode and its configuration. For example, k may be fixed to 4 for the FDD LTE system.

For the TDD LTE system, the value of k may vary according to the subframe configuration and subframe number. When data is transmitted through a plurality of carriers, the value of k may be applied differently according to the TDD configuration of each carrier. For TDD, the value of k is determined according to the TDD UL/DL configuration as illustrated in Table 3.

TABLE 3

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Meanwhile, HARQ ACK information carried by the PHICH transmitted at subframe i is associated with the PUSCH transmitted at subframe i−k. For the FDD system, the value of k is given as 4. That is, in the FDD system, HARQ ACK information carried by the PHICH transmitted at subframe i is associated with the PUSCH transmitted at subframe i−4. In the case of the TDD system, for the terminal where EIMTA (enhanced interference management and traffic adaptation) is not set, when only one serving cell is configured or the same TDD UL/DL configuration is set, the value of k may be given according to Table 4 below for TDD UL/DL configurations 1 to 6.

TABLE 4

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | 6 | | |
| 3 | 6 | | | | | | | 6 | 6 | |
| 4 | | | | | | | | 6 | 6 | |
| 5 | | | | | | | | 6 | | |
| 6 | 6 | 4 | | | | | 7 | 4 | | 6 |

For example, for TDD UL/DL configuration 1, the PHICH transmitted at subframe 6 may be the HARQ ACK information of the PUSCH transmitted at subframe 2, which is four subframes earlier.

For TDD UL/DL configuration 0, if HARQ ACK is received via the PHICH resource corresponding to $I_{PHICH}=0$, the PUSCH associated with the HARQ ACK information is transmitted at subframe i−k, and the value of k is given in accordance with Table 4 above. For TDD UL/DL configuration 0, if HARQ ACK is received via the PHICH resource corresponding to $I_{PHICH}=1$, the PUSCH associated with the HARQ ACK information is transmitted at subframe i−6.

The above description of the wireless communication system is based on the LTE system, and the present invention is not limited only to the LTE system but can be applied to various wireless communication systems such as NR (New Radio) and 5G systems. When applied to another wireless communication system in one embodiment, the value of k may be changed and applied to a system using a modulation scheme corresponding to FDD.

Figure 1C:
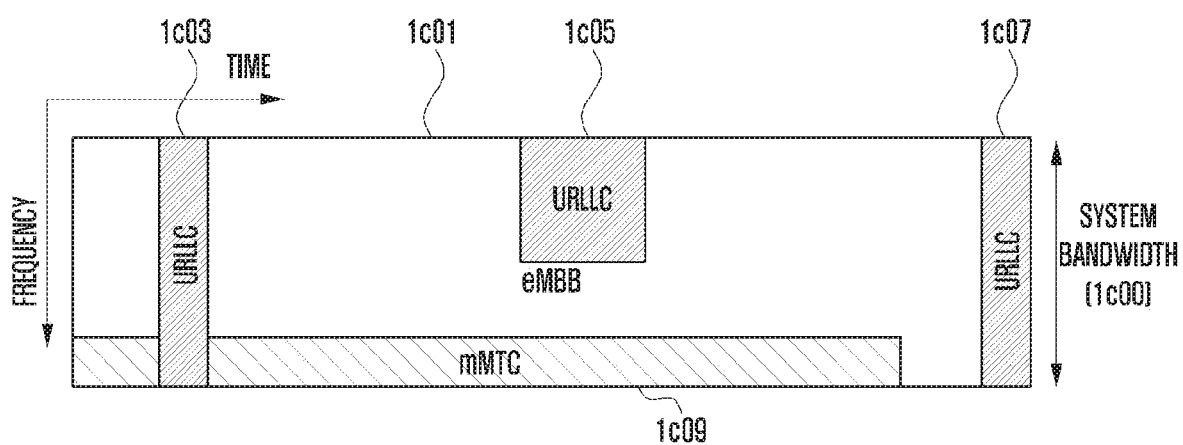
FIG. 1C illustrates pieces of data for eMBB, URLLC, and mMTC allocated in time-frequency resources in a communication system.
Figure 1D:
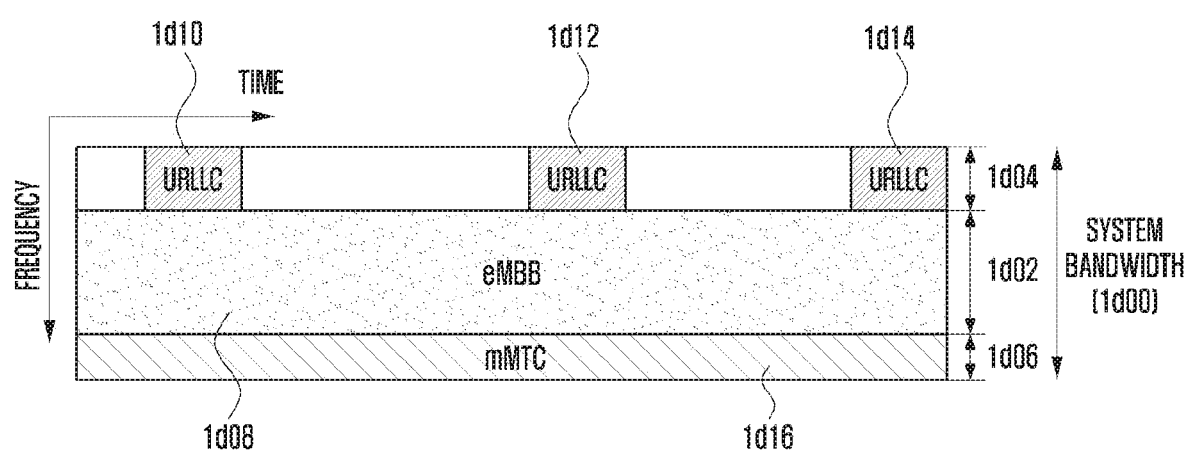
FIG. 1D illustrates pieces of data for eMBB, URLLC, and mMTC allocated in time-frequency resources in a communication system.

FIGS. 1C and 1D illustrate the allocation of eMBB data, URLLC data, and mMTC data, which are related with services considered in the 5G or NR system, in time-frequency resources.

FIG. 1C and FIG. 1D show a method in which frequency and time resources are allocated for information transmission in each system.

In FIG. 1C, eMBB data, URLLC data, and mMTC data are allocated in the entire system frequency band 1000. When eMBB data 1c01 and mMTC data 1c09 are already allocated and transmitted in a specific frequency band, pieces of URLLC data 1c03, 1c05 and 1c07 are generated and need to be transmitted. In this case, the URLLC data 1c03, 1c05 and 1c07 can be transmitted after emptying or not transmitting a portion where the eMBB data 1c01 and the mMTC data 1c09 are already allocated. Among the above services, since URLLC needs to reduce the latency time, the URLLC data 1c03, 1c05 and 1c07 can be allocated to parts of the resource 1c01 to which the eMBB data is allocated. Here, when URLLC data is additionally allocated to the resource to which the eMBB data is already allocated, the eMBB data may be not transmitted in the overlapping frequency-time resource, and thus the transmission performance of the eMBB data may be lowered. That is, in such a case, eMBB data transmission may fail owing to the allocation of URLLC data.

In FIG. 1D, the entire system frequency band 1d00 can be divided into subbands 1d02, 1d04 and 1d06 to transmit services and data. Information related to the subband configuration can be preset, and this information can be transmitted from the base station to the terminal through higher-layer signaling. Alternatively, the information related to the subbands may be distributed among the base station and network nodes, and the services may be provided to the terminal without separately transmitting the subband configuration information. In FIG. 1D, the subband 1d02 is used for eMBB data transmission, the subband 404 is used for URLLC data transmission, and the subband 1d06 is used for mMTC data transmission.

In various embodiments, the length of the transmission time interval (TTI) for URLLC transmission may be shorter than that of the TTI for eMBB or mMTC transmission. In addition, the response for URLLC information can be transmitted faster than eMBB or mMTC data, so that URLLC information can be transmitted and received with low latency.

Figure 1E:
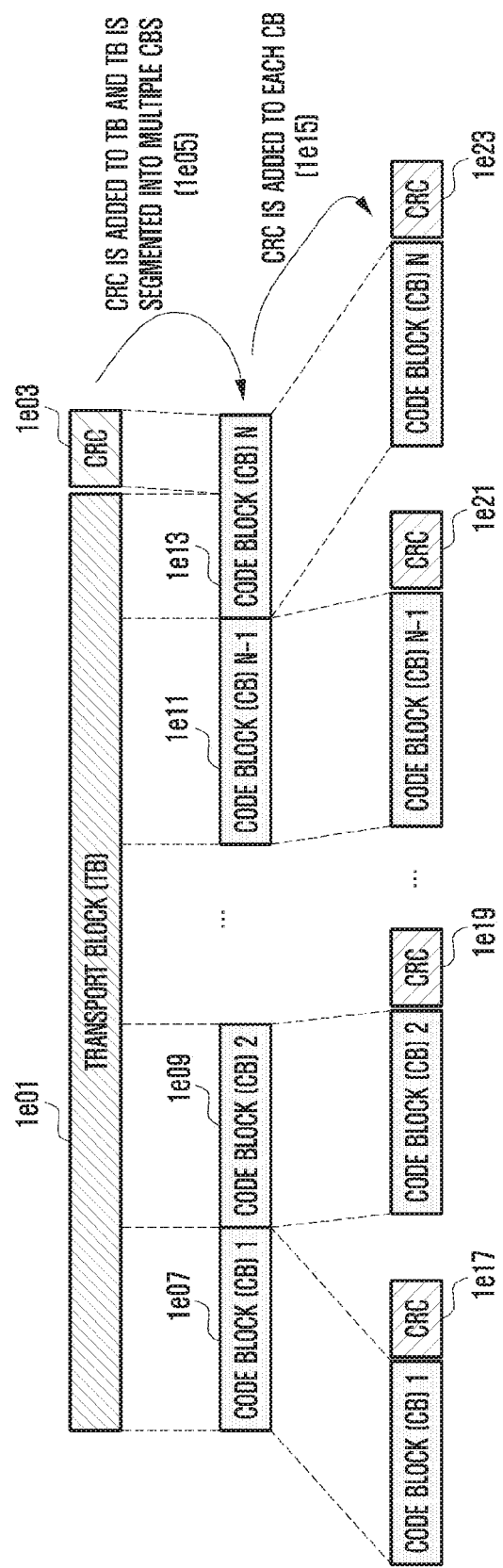
FIG. 1E shows a structure where one transport block is divided into several code blocks and a CRC is added according to an embodiment.

FIG. 1E shows a process where one transport block is divided into several code blocks and a CRC is added.

With reference to FIG. 1E, a CRC 1e03 may be added to the last part or first part of one transport block (TB) 1e01 to be transmitted in the uplink or the downlink. The CRC may have 16 or 24 bits, a preset number of bits, or a variable number of bits depending on the channel condition, and may be used to determine whether channel coding is successful.

The TB including TB CRC (1e01, 1e03) can be divided into several code blocks (CBs) 1e07, 1e09, 1e11 and 1e13 (1e05). The maximum size of the code block may be predefined. In this case, the last code block 1e13 may be smaller than the other code blocks, or may be set to have the same length as the other code blocks by padding 0, a random value or 1 in the code block. CRCs 1e17, 1e19, 1e21 and 1e23 may be added to the divided code blocks, respectively (1e15). The CB CRC may have 16 or 24 bits, or a preset number of bits, and may be used to determine whether channel coding is successful.

The CRC 1e03 added to the TB and the CRCs 1e17, 1e19, 1e21 and 1e23 added to code blocks may be omitted depending on the type of the channel code to be applied to the code block. For example, when an LDPC (low density parity check) code is applied to the code block instead of a turbo code, the CRCs 1e17, 1e19, 1e21 and 1e23 to be added to the individual code blocks may be omitted. However, even when an LDPC code is applied, the CRCs 1e17, 1e19, 1e21 and 1e23 can still be added to the code blocks. Also, the CB CRC can be added or omitted when a polar code is applied.

In the following description, the eMBB service is referred to as a first type service, and the eMBB data is referred to as first type data. The first type service or the first type data is not limited only to eMBB, but may be applied to a case where high-speed data transmission is required or broadband transmission is performed.

The URLLC service is referred to as a second type service, and the URLLC data is referred to as second type data. The second type service or second type data is not limited only to URLLC, but may be applicable to other systems requiring low latency, requiring high reliability transmission, or requiring both low latency and high reliability at the same time.

The mMTC service is referred to as a third type service, and the mMTC data is referred to as third type data. The third type service or the third type data is not limited only to mMTC, but may be applied to a case where low speed, wide coverage, or low power is required. Additionally, in the description of embodiments, it may be understood that the first type service includes or does not include the third type service.

For transmitting the above three types of services or data, the structure of the physical layer channel used for each type may be different. For example, at least one of the TTI length, frequency resource allocation unit, control channel structure, and data mapping scheme may be different among them.

Although three services and three pieces of data have been described above, more types of services and corresponding data may exist. In this case, the contents of the present invention can also be applied.

The terms "physical channel" and "signal" in the existing LTE or LTE-A system may be used to describe the method and apparatus proposed in the embodiments. However, the present invention can be applied to wireless communication systems other than the LTE and LTE-A systems.

The embodiments specify transmission and reception operations for the terminal and the base station to transmit the first, second, and third type services or data, and propose a method for operating terminals receiving different types of services or data scheduling together in the same system. In the description, the first type terminal, the second type terminal, and the third type terminal refer to the terminals that receive the first type, the second type, and the third type services or data scheduling, respectively. In one embodiment, the first type terminal, the second type terminal, and the third type terminal may be the same terminal or may be different terminals.

In various embodiments, at least one of the PHICH, the uplink scheduling grant signal, and the downlink data signal is referred to as a first signal. At least one of the uplink data signal for an uplink scheduling grant and HARQ ACK/NACK for a downlink data signal is referred to as a second signal. In one embodiment, among the signals transmitted from the base station to the terminal, a signal that expects a response from the terminal may be a first signal, and a response signal of the terminal corresponding to a first signal may be a second signal. In one embodiment, the first signal may correspond to at least one of the eMBB service, the URLLC service, and the mMTC service, and the second signal may also correspond to at least one of these services.

For example, in the LTE and LTE-A systems, PUCCH format 0 or 4 and the PHICH may be a first signal, and the corresponding second signal may be the PUSCH. As another example, in the LTE and LTE-A systems, the PDSCH may be a first signal, and the PUCCH or PUSCH carrying the HARQ ACK/NACK information for the PDSCH may be a second signal. The PDCCH or EPDCCH carrying an aperiodic CSI trigger may be a first signal, and a corresponding second signal may be the PUSCH carrying channel measurement information.

In various embodiments, assume that the base station transmits a first signal in the $n^{th}$ TTI and the terminal transmits a second signal at the $n+k^{th}$ TTI. In this case, the fact that the base station notifies the terminal of the timing to transmit the second signal corresponds to the fact that the base station notifies the terminal of the k value. Assume that the base station transmits a first signal at the $n^{th}$ TTI and the terminal transmits a second signal at the $n+4+a^{th}$ TTI. In this case, the fact that the base station notifies the terminal of the timing to transmit the second signal corresponds to the fact that the base station notifies the terminal of an offset a. Here, the offset can be defined in various ways such as n+3+a and n+5+a instead of n+4+a. As in the case of n+4+a mentioned in the present invention, the offset a can be defined in various ways.

The description of the present invention is focused on the FDD LTE system, but it can also be applied to the TDD LTE system and the NR system.

In the description, higher-layer signaling indicates transmission of a signal from the base station to the terminal using a downlink data channel of the physical layer or from the terminal to the base station using an uplink data channel of the physical layer, and it may be referred to as RRC signaling, or PDCP signaling, or a MAC control element (MAC CE).

The present invention describes a method of determining, after the terminal or the base station receives a first signal, the timing of transmitting a second signal, but the second signal can be transmitted in various ways. For example, after receiving the PDSCH being downlink data, the terminal may determine the timing for sending the HARQ ACK/NACK information corresponding to the PDSCH to the base station according to the method described in the present invention, but the terminal may select a PUCCH format to be used, select a PUCCH resource, or map HARQ ACK/NACK information to the PUSCH according to the method of the existing LTE system.

In the present invention, the normal mode is a mode in which the transmission timings set for the first signal and the second signal in the existing LTE and LTE-A systems are used. In the normal mode, it is possible to secure a signal processing time of about 3 ms including TA (timing advance). For example, in the FDD LTE system operating in the normal mode, for the first signal received by the terminal at subframe n, the second signal is transmitted by the terminal at subframe n+4. In the description, this transmission can be referred to as timing n+4 transmission. If a second signal for the first signal transmitted at subframe n+k has been scheduled to be transmitted at timing n+4, this means that the second signal is transmitted at subframe n+k+4.

Meanwhile, in the present invention, the latency reduction mode is a mode that enables the transmission timing of the second signal for a first signal to be earlier than or equal to that of the normal mode, and the latency time can be reduced. In the latency reduction mode, the timing can be controlled in various ways. In the description, the latency reduction mode may be used interchangeably with the reduced processing time mode.

The latency reduction mode may be configured for a terminal supporting the latency reduction mode via higher-layer signaling. For a first signal transmitted at subframe n, the terminal in the latency reduction mode may transmit the second signal at a timing earlier than subframe n+4. For example, for a first signal transmitted at subframe n, the terminal in the latency reduction mode may transmit the second signal at subframe n+3. In the description, this transmission can be referred to as timing n+3 transmission. If a second signal for the first signal transmitted at subframe n+1 has been scheduled to be transmitted at timing n+3, this means that the second signal is transmitted at subframe n+4. For example, if a second signal for the first signal transmitted at subframe n+2 has been scheduled to be transmitted at timing n+3, this means that the second signal is transmitted at subframe n+5.

That is, if a second signal for the first signal transmitted at subframe n+k has been scheduled to be transmitted at timing n+3, this means that the second signal is transmitted at subframe n+k+3.

The following description is focused on the case where transmission time intervals (TTI) used in the normal mode and the latency reduction mode are the same. However, the present invention can also be applied to the case where the TTI length in the normal mode is different from that in the latency reduction mode.

In various embodiments, if the first signal is the PDSCH, the second signal may be the PUCCH or PUSCH carrying HARQ ACK information for the PDSCH. If the first signal is the PHICH or the PDCCH or EPDCCH carrying uplink scheduling information, the second signal may be the PUSCH for the uplink scheduling. If the first signal is the PDCCH or EPDCCH carrying an aperiodic CSI trigger, the second signal may be the PUSCH carrying channel measurement information.

When the latency reduction mode is configured for the terminal via higher-layer signaling, as there is an uncertainty as to when the higher-layer signaling is delivered to the terminal, a method may be required that allows the second signal to always be transmitted at a preset timing regardless of the configuration set by the base station. For example, although the base station configures the terminal with the latency reduction mode to perform timing n+3 transmission, it cannot know exactly when the delay reduction mode is effective for the terminal.

Therefore, a method may be needed that enables the base station to direct the terminal to perform timing n+4 transmission during the mode setting. That is, a method of performing timing n+4 transmission may be required regardless of the latency reduction mode configuration. In the description, the method of performing timing n+4 transmission irrespective of the latency reduction mode setting can be used interchangeably with fallback mode transmission. Hence, when the fallback mode transmission is performed, the base station performs the uplink reception operation on the assumption that the second signal is transmitted at timing n+4 instead of timing n+3 or n+2.

The fallback mode transmission may be performed in at least one case among 1) when the first signal is delivered in a specific downlink control information (DCI) format, 2) when the DCI for the first signal is delivered in a specific search space, and 3) when the DCI is delivered using a specific RNTI value set in advance.

The search space may be a cell-specific search space (CSS) or a UE-specific search space (USS) and can be defined as follows. At subframe k, for aggregation level L, the control channel element (CCE) number to which the downlink control signal and the control channel can be mapped may be calculated as follows.

$$L\left\{(Y_k + m') \bmod \left\lfloor \frac{N_{CCE,k}}{L} \right\rfloor \right\} + i$$

For aggregation levels 4 and 8, $Y_k$ is set to 0 in CSS. In USS, $Y_k=(A*Y_{k-1}) \bmod D$, $Y_{-1}=n_{RNTI}$ (non-zero), A=39827, D=65537, $k=\lfloor n_s/2 \rfloor$, where $n_s$ is slot number. Here, x mod y can refer to the remainder of x divided by y, and $M^{(L)}$ denotes the number of downlink control channels for aggregation level L. In addition, m may be a natural number from 0 to $M^{(L)}$, m'=m in CSS, m'=m+$M^{(L)}$f*$n_{CI}$ in USS, and $n_{CI}$ may be a carrier indicator field value.

In case 1), delivery of the first signal in a specific DCI format is used as the fallback mode transmission. For example, when downlink scheduling is performed in DCI format 1A in the existing LTE system, the second signal can always be transmitted at timing n+4 regardless of the latency reduction mode configured by the base station. That is, in this case, although the terminal is configured to transmit the second signal at timing n+3, if downlink scheduling is performed in DCI format 1A, the terminal transmits the second signal at timing n+4.

In case 2), delivery of the DCI for the first signal in a specific search space is used as the fallback mode transmission. For example, when the DCI is delivered in a region set as the cell common search space, the second signal can always be transmitted at timing n+4 regardless of the latency reduction mode configured by the base station as to the first signal associated with the DCI. That is, in this case, although the terminal is configured to transmit the second signal at timing n+3, if the DCI is delivered in the cell common search space, the terminal transmits the second signal at timing n+4.

In case 3), delivery of the DCI using a preset RNTI value is used as the fallback mode transmission. For example, when the base station configures in advance an RNTI for the fallback mode transmission, generate the PDCCH or EPDCCH using the RNTI, and delivers the DCI to the terminal, the second signal can always be transmitted at timing n+4 regardless of the latency reduction mode configured by the base station as to the first signal associated with the DCI. That is, in this case, although the terminal is configured to transmit the second signal at timing n+3, if the PDCCH or EPDCCH is decoded successfully using the above RNTI value, the terminal transmits the second signal at timing n+4.

Figure 1F:
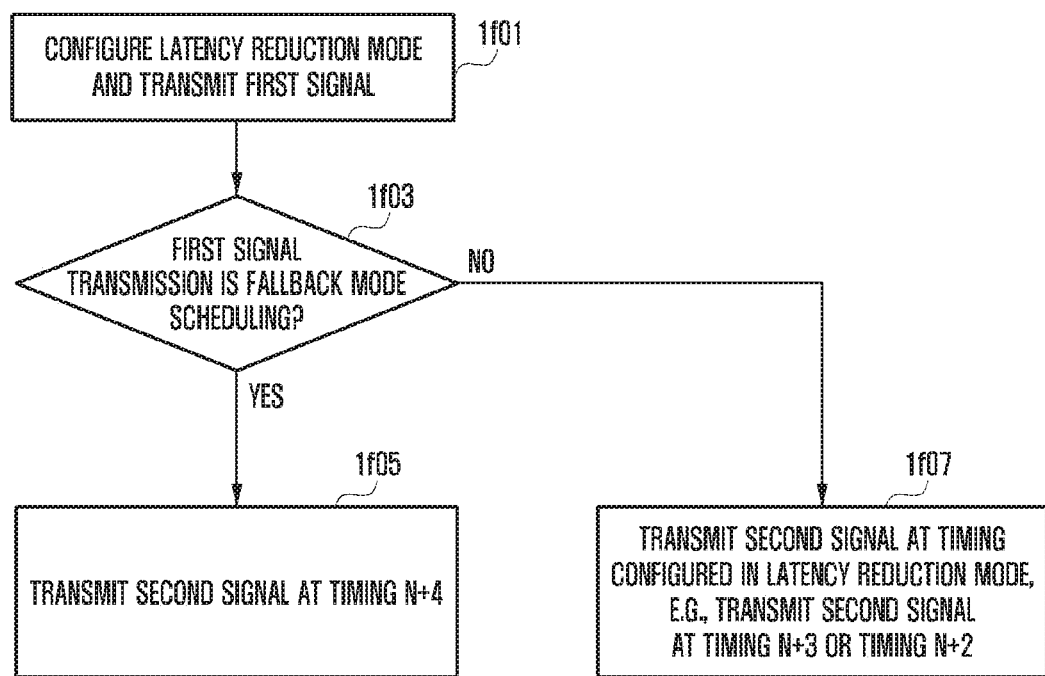
FIG. 1F illustrates a method for the terminal to perform uplink transmission.

FIG. 1F depicts a method in which the terminal performs uplink transmission when the base station configures the terminal with the latency reduction mode and transmits a first signal (1/01). When the first signal is received from the base station (1/01), the terminal identifies whether the transmission of the first signal is fallback mode scheduling (1/03). If fallback mode scheduling, the terminal transmits the second signal at timing n+4 regardless of the latency reduction mode configuration (1/05). If not fallback mode scheduling, the terminal transmits the second signal at a timing configured in the latency reduction mode, for example, timing n+3 or timing n+2 (1/07).

In the description, embodiments of the present invention can be described by markers such as 1), 2) and 3).

In the present invention, the transmission mode in which the earliest transmission timing of the second signal for the first signal transmitted at subframe n is subframe n+4 may be referred to as the normal mode, and the transmission mode in which the earliest transmission timing of the second signal for the first signal transmitted at subframe n is subframe n+2 or subframe n+3 may be referred to as the latency reduction mode or reduced processing time mode. Here, subframe n+4 is the reference transmission timing for distinguishing the normal mode from the latency reduction mode. In another embodiment, the reference transmission timing may be changed to a different timing.

Embodiment 1

Figure 1G:
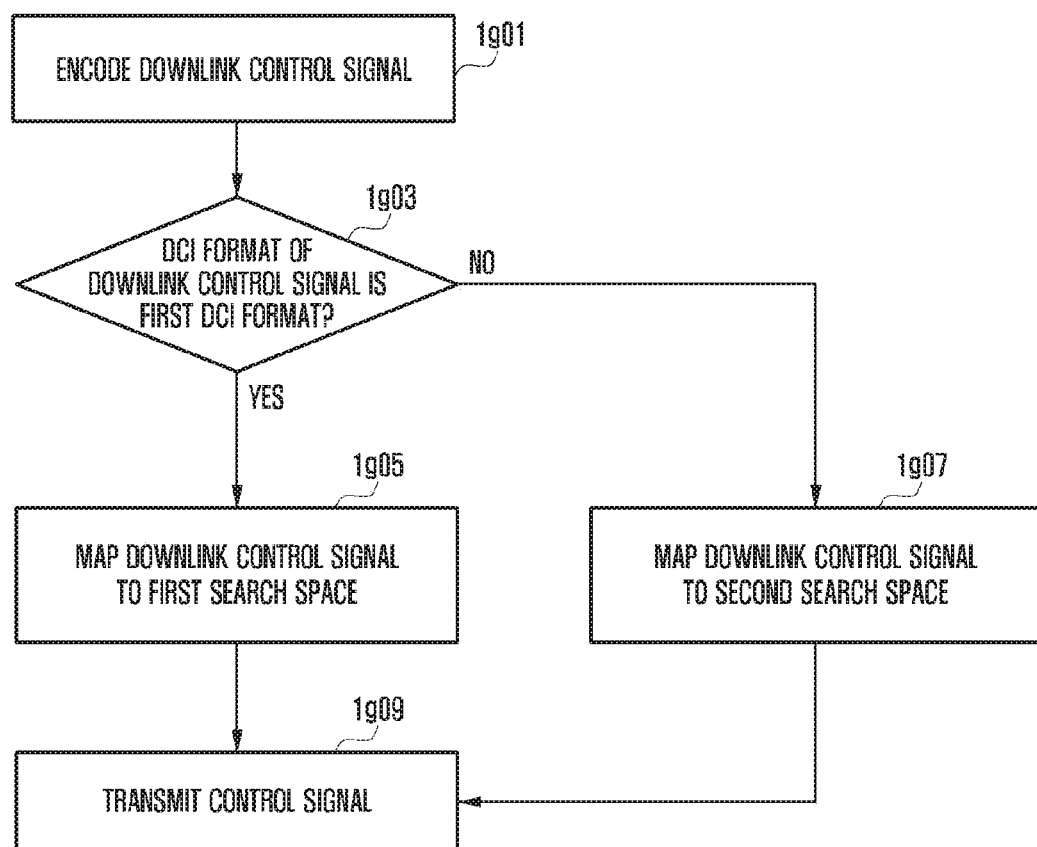
FIG. 1G illustrates operations of the base station according to the first embodiment.
Figure 1H:
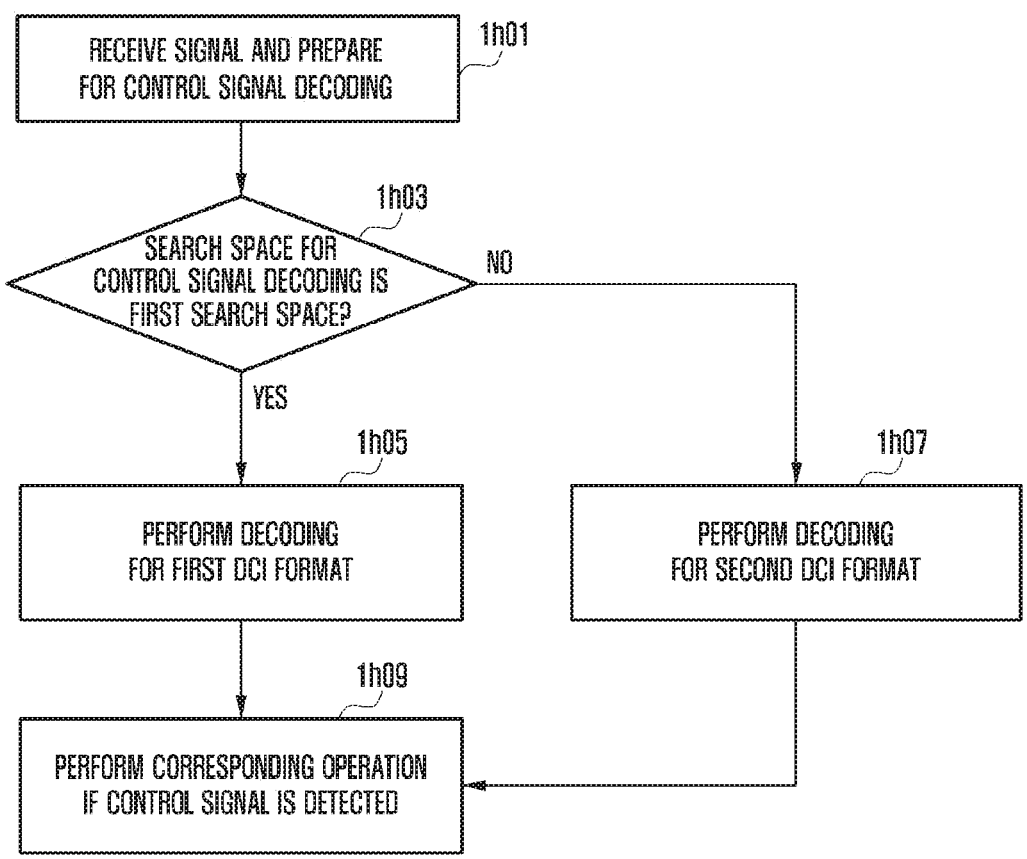
FIG. 1H illustrates operations of the terminal according to the first embodiment.
Figure 11:
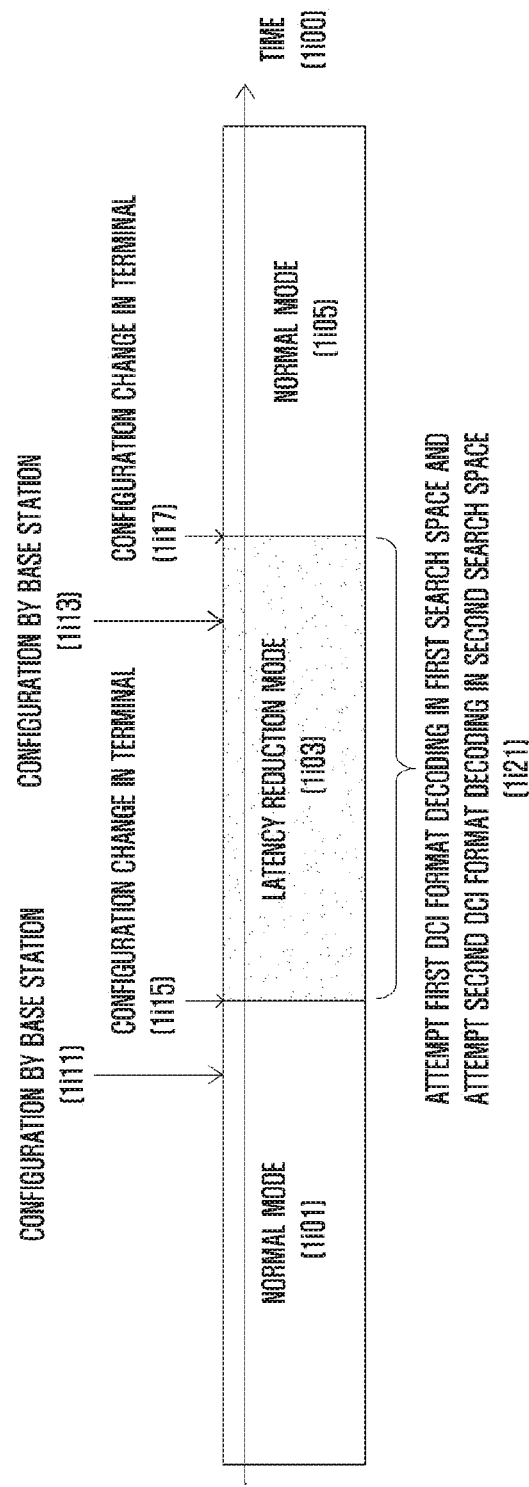

In the first embodiment, a description is given of a method for the terminal to detect a downlink control signal with reference to FIGS. 1G, 1H and 1I.

The base station and the terminal can agree to or configure in advance a resource region in which downlink control signals can be transmitted. The resource region in which downlink control signals can be transmitted may be referred to as a search space. The search space may be divided into a first search space and a second search space; and the control signal for the latency reduction mode transmission such as timing n+2 or timing n+3 transmission may be transmitted via the first search space, and the control signal for the normal mode transmission such as timing n+4 transmission may be transmitted via the second search space. That is, the second signal for the control signal found in the first search space at subframe n is transmitted at subframe n+2 or n+3, and the second signal for the control signal found in the second search space at subframe n is transmitted at subframe n+4.

Alternatively, the DCI format (the format of the downlink control signal) transmitted via the first search space and the DCI format transmitted via the second search space may be different from each other. For example, in the case of the DCI format for uplink scheduling, DCI format 0 or 4 may be transmitted via the first search space and DCI format 0C or 4C may be transmitted via the second search space. Here, DCI format 0C may be a format in which bits indicating the HARQ process ID and RV (redundancy version) are added to DCI format 0, and DCI format 4C may be a format in which bits indicating the HARQ process ID and RV are added to DCI format 4.

When DCI format 0 or 4 is decoded and when DCI format 0C or 4C is decoded, the timing of transmitting the associated second signal may be different and may also be different depending on the settings. That is, the terminal can operate in the normal mode when DCI format 0 or 4 is decoded, and can operate according to latency reduction mode settings when DCI format 0C or 4C is decoded.

In the description, the control signal format for the normal mode transmission may be referred to as a first DCI format, and the control signal format for the latency reduction mode operation may be referred to as a second DCI format. In the above example, DCI format 0 or 4 is the first DCI format and DCI format 0C or 4C is the second DCI format.

In the description, for example, the first search space may be a cell-specific search space (CSS), and the second search space may be a UE-specific search space (USS).

FIG. 1G is a flowchart showing a method for the base station to select and map a search space according to the control signal format and transmit a control signal. The base station encodes a control signal to be transmitted to a specific terminal (1g01). The base station determines whether the DCI format for the downlink control signal is the first DCI format (1g03). If the DCI format of the downlink control signal is the first DCI format, the base station maps the control signal to the first search space (1g05). If the DCI format of the downlink control signal is the second DCI format, the base station maps the control signal to the second search space (1g07). After mapping to the search space, the base station transmits the control signal (1g09). Transmission of the control signal may involve Fourier transform, and transmission filtering.

FIG. 1H is a flowchart showing a method for the terminal to determine the DCI format to be decoded according to the search space and perform control signal decoding.

The terminal receives a signal at the corresponding subframe, slot or mini-slot and prepares for control signal decoding (1h01). The terminal identifies whether the search space for control signal decoding is the first search space (1h03). If the search space is the first search space, the terminal performs control signal decoding for the first DCI format in the first search space (1h05). If the search space is not the first search space, the terminal performs control signal decoding for the second DCI format in the second search space (1h07). If a control signal is detected in the search space, the terminal performs an operation corresponding to the detected control signal (1h09). The operation corresponding to the control signal may be downlink data reception and associated HARQ feedback transmission or uplink data transmission.

FIG. 1I depicts an example of latency reduction mode setting and control signal detection over time in the terminal. With passage of time, the base station may cause the terminal to switch between the normal mode and the latency reduction mode (1i01, 1i03, 1i05). This configuration change can be notified by the base station through higher-layer signaling (1i11, 1i13). The terminal can change the settings according to the configuration from the base station (1i15, 1i17). As described above, when the latency reduction mode is set (1i03), the terminal performs control signal decoding based on the first DCI format in the first search space and performs control signal decoding based on the second DCI format.

Embodiment 2

Figure 1J:
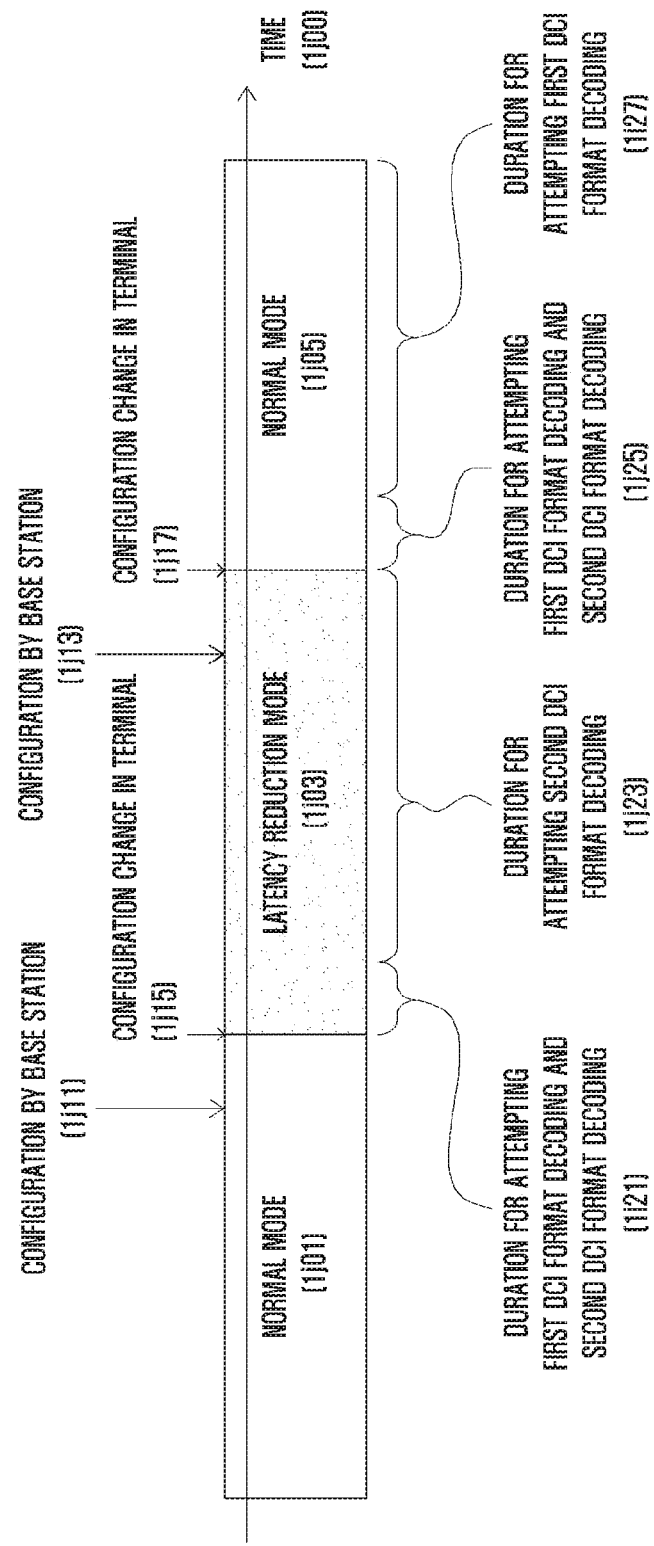
FIG. 1J depicts a control signal decoding method according to the second embodiment.

In the second embodiment, a description is given of a method in which the terminal trying to detect a downlink control signal does not perform decoding on a specific DCI format after a given time from configuration of the latency reduction mode with reference to FIG. 1J.

The DCI format for detection in the normal mode may be different from the DCI format for detection in the latency reduction mode. For example, in the case of the DCI format for uplink scheduling, it may be assumed that DCI format 0 or 4 is used to transmit uplink scheduling information in the normal mode and DCI format 0C or 4C is used to transmit uplink scheduling information in the latency reduction mode.

As the base station changes the configuration of the terminal from the normal mode to the latency reduction mode through RRC signaling, the base station and the terminal may not know exactly when the new configuration is applied. Hence, when the configuration changes from the normal mode to the latency reduction mode, even if the terminal has changed its configuration to the latency reduction mode, the base station may use the scheduling scheme in the normal mode for a given time.

For example, in the case of the DCI format for uplink scheduling, although the configuration is changed to the latency reduction mode, uplink scheduling information may be transmitted to the terminal in DCI format 0 or 4 for a given time. Hence, after receiving RRC signaling for configuring the latency reduction mode, the terminal may attempt to decode both the DCI format for the normal mode and the DCI format for the latency reduction mode for the given time.

For example, in the case of the DCI format for uplink scheduling, upon receiving RRC signaling for configuring the latency reduction mode, the terminal may attempt to decode both DCI format 0 or 4 and DCI format 0C or 4C for a given time. In one embodiment, the terminal may use a timer to determine whether a given time has elapsed, or may determine that a given time has elapsed when a physical layer signal is received from the base station.

FIG. 1J depicts an example of latency reduction mode setting and control signal detection over time in the terminal. With passage of time, the base station may cause the terminal to switch between the normal mode and the latency reduction mode (1j01, 1j03, 1j05). This configuration change can be notified by the base station through higher-layer signaling (1j11, 1j13). The terminal can change the settings according to the configuration from the base station (1j15, 1j17).

As described above, when the latency reduction mode is set (1j03), the terminal attempts to decode the first DCI format and the second DCI format during a given time (1j21). After the given time from configuration of the latency reduction mode, the terminal may attempt to decode only the control signal for the second DCI format (1j23). Thereafter, when the normal mode is configured again (1j05), the terminal attempts to decode the first DCI format and the second DCI format for a given time (1j25). After the given time from configuration of the normal mode, the terminal may attempt to decode only the control signal for the first DCI format (1j27).

Figure 1K:
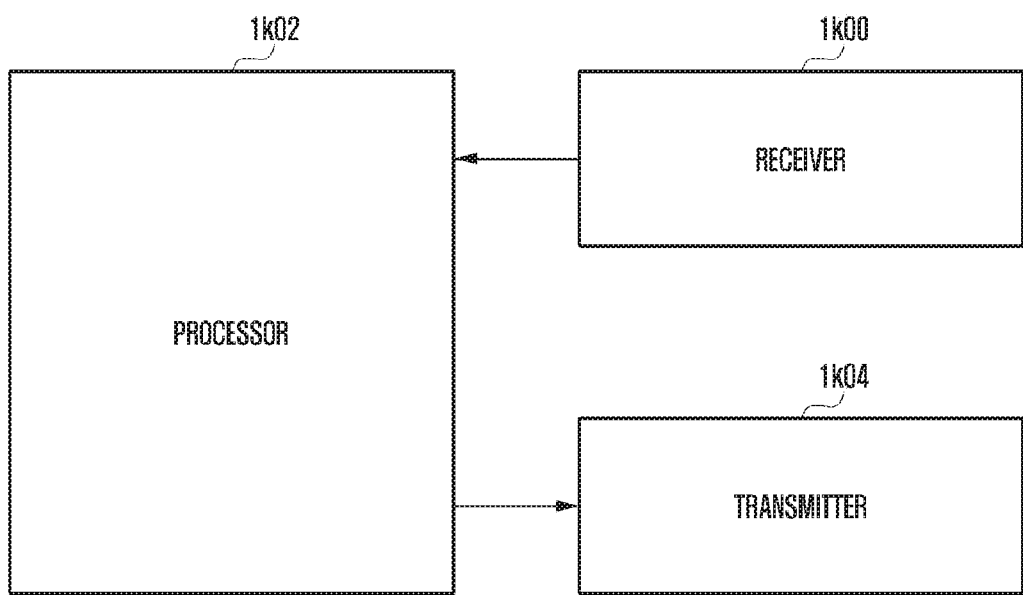
FIG. 1K is a block diagram of a terminal according to various embodiments.
Figure 1L:
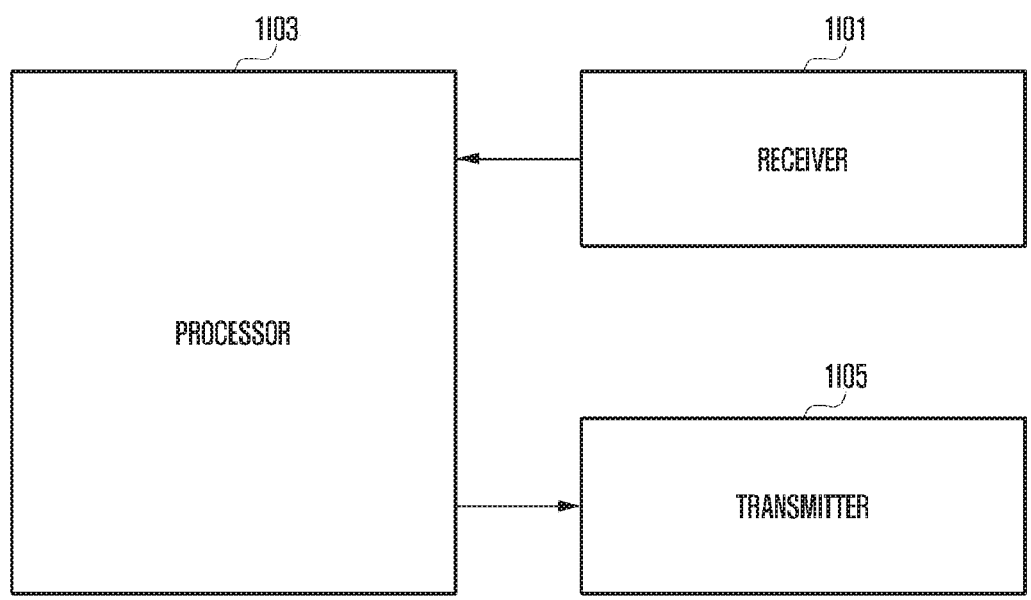
FIG. 1L is a block diagram of a base station according to various embodiments.

To carry out the above-described embodiments of the present invention, the terminal including a transmitter, a receiver and a processor is shown in FIG. 1K, and the base station including a transmitter, a receiver and a processor is shown in FIG. 1L. The first and second embodiments describe the transmission and reception operations of the base station and the terminal to perform the control signal detection method based on the search space. To perform the method, the base station and the terminal should operate their transmitters, receivers and processors according to the embodiments.

Specifically, FIG. 1K is a block diagram of the terminal according to an embodiment of the present invention. As shown in FIG. 1K, the terminal may include a receiver 1k00, a transmitter 1k04, and a processor 1k02. In one embodiment, the receiver 1k00 and the transmitter 1k04 may be collectively referred to as a transceiver.

The transceiver of the terminal can transmit and receive signals to and from the base station. The signal may include control information and data. To this end, the transceiver may include an RF (radio frequency) transmitter for up-converting and amplifying the frequency of a signal to be transmitted, and an RF receiver for low-noise amplifying a received signal and down-converting the frequency of the received signal. In addition, the transceiver may receive a signal through a wireless channel and forward it to the processor 1k02, and transmit a signal output from the processor 1k02 through a wireless channel.

The processor 1k02 of the terminal may control a series of operations so that the terminal can operate according to the embodiments of the present invention described above. For example, the processor 1k02 may control the receiver 1k00 to receive a signal including a control signal, and control decoding operation by determining the DCI format for performing decoding according to the search space. Thereafter, if there is a need to transmit a second signal in relation to the control signal, the processor 1k02 may control the transmitter 1k04 to transmit the second signal at a determined timing.

FIG. 1L is a block diagram of the base station according to an embodiment of the present invention. As shown in FIG. 1L, the base station may include a receiver 1101, a transmitter 1105, and a processor 1103. In one embodiment, the receiver 1101 and the transmitter 1105 may be collectively referred to as a transceiver.

The transceiver of the base station can transmit and receive signals to and from terminals. The signal may include control information and data. To this end, the transceiver may include an RF transmitter for up-converting and amplifying the frequency of a signal to be transmitted, and an RF receiver for low-noise amplifying a received signal and down-converting the frequency of the received signal.

In addition, the transceiver may receive a signal through a wireless channel and forward it to the processor 1103, and transmit a signal output from the processor 1103 through a wireless channel. The processor 1103 of the base station may control a series of operations so that the base station can operate according to the embodiments of the present invention described above.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents. In addition, the above embodiments can be combined with each other as needed. For example, the base station and the terminal may operate according to combinations of specific parts of the first and second embodiments of the present invention. Although the above embodiments are described on the basis of the LTE or LTE-A system, their variants based on the subject matter may be applicable to other systems such as 5G and NR systems.

The invention claimed is:

1. A method performed by a terminal in a wireless communication system, the method comprising:
    receiving, from a base station, configuration information for configuring a latency reduction mode;
    monitoring, based on the configuration information, control information transmitted from the base station, the control information including scheduling information for an uplink data transmission; and
    transmitting uplink data based on the scheduling information at a first timing according to the latency reduction mode or a second timing according to a normal mode, based on a type of a radio network temporary identifier (RNTI) used to decode the control information, the first timing being faster than the second timing,
    wherein the type of the RNTI is a cell RNTI for the latency reduction mode, and the type of the RNTI is a preset RNTI for the normal mode,
    wherein the cell RNTI is used for decoding the control information, in case that the control information is detected in a user equipment (UE) specific search space,
    wherein decoding of the control information by the cell RNTI is based on a first downlink control information (DCI) format which includes information on a hybrid automatic repeat request (HARQ) process identification and information on a redundancy version (RV), and
    wherein decoding the control information using the preset RNTI is based on a second DCI format which does not include the information on the HARQ process identification and the information on the RV.

2. The method of claim 1, wherein the preset RNTI is used for decoding the control information, in case that the control information is detected in a common search space.

3. The method of claim 1, wherein monitoring the control information comprises:
    decoding the control information based on both the first DCI format and the second DCI format during a preset time, based on the configuration information.

4. A method performed by a base station in a wireless communication system, the method comprising:
    transmitting, to a terminal, configuration information for configuring a latency reduction mode;
    transmitting, to the terminal, control information transmitted from the base station, the control information including scheduling information for an uplink data transmission; and
    receiving, from the terminal, uplink data based on the scheduling information based on a type of a radio network temporary identifier (RNTI) used to decode the control information, the uplink data being transmitted at a first timing according to the latency reduction mode or a second timing according to a normal mode, the first timing being faster than the second timing,
    wherein the type of the RNTI is a cell RNTI for the latency reduction mode, and the type of the RNTI is a preset RNTI for the normal mode,
    wherein the control information generated based on the cell RNTI and a first downlink control information (DCI) format, which includes information on a hybrid automatic repeat request (HARQ) process identification and information on a redundancy version (RV) is transmitted in a user equipment (UE) specific search space, and wherein the control information generated based on the preset RNTI and a second DCI format which does not include the information on the HARQ process identification and the information on the RV.

5. The method of claim 4, further comprising:

transmitting, to the terminal, the control information generated based on the preset RNTI in a common search space.

6. A terminal in a wireless communication system, comprising:

a transceiver; and a controller configured to:
  control the transceiver to receive, from a base station, configuration information for configuring a latency reduction mode,
  monitor, based on the configuration information, control information transmitted from the base station, the control information including scheduling information for an uplink data transmission, and
  control the transceiver to transmit uplink data based on the scheduling information at a first timing according to the latency reduction mode or a second timing according to a normal mode, based on a type of a radio network temporary identifier (RNTI) used to decode the control information, the first timing being faster than the second timing, wherein the type of the RNTI is a cell RNTI for the latency reduction mode, and the type of the RNTI is a preset RNTI for the normal mode, wherein the cell RNTI is used for decoding the control information, in case that the control information is detected in a user equipment (UE) specific search space, wherein decoding of the control information by the cell RNTI is based on a first downlink control information (DCI) format which includes information on a hybrid automatic repeat request (HARQ) process identification and information on a redundancy version (RV), and wherein decoding the control information using the preset RNTI is based on a second DCI format which does not include the information on the HARQ process identification and the information on the RV.

7. The terminal of claim 6, wherein the controller is further configured to decode the control information using the preset RNTI, in case that the control information is detected in a common search space.

8. The terminal of claim 6, wherein the controller is further configured to decode the control information based on both the first DCI format and the second DCI format during a preset time, based on the configuration information.

9. A base station in a wireless communication system, comprising:

a transceiver; and a controller configured to:
  control the transceiver to transmit, to a terminal, configuration information for configuring a latency reduction mode,
  control the transceiver to transmit, to the terminal, control information transmitted from the base station, the control information including scheduling information for an uplink data transmission, and
  control the transceiver to receive, from the terminal, uplink data based on the scheduling information based on a type of a radio network temporary identifier (RNTI) used to decode the control information, the uplink data being transmitted at a first timing according to the latency reduction mode or a second timing according to a normal mode, the first timing being faster than the second timing, wherein the control information generated based on the cell RNTI and a first downlink control information (DCI) format which includes information on a hybrid automatic repeat request (HARQ) process identification and information on a redundancy version (RV) is transmitted in a user equipment (UE) specific search space, and wherein the control information generated based on the preset RNTI and a second DCI format which does not include the information on the HARQ process identification and the information on the RV.

10. The base station of claim 9, wherein the controller is further configured to control the transceiver to transmit, to the terminal, the control information generated based on the preset RNTI in a common search space.

* * * * *